United States Patent [19]
Ungchusri et al.

[11] Patent Number: 4,930,791
[45] Date of Patent: Jun. 5, 1990

[54] PLASTIC BORE SEAL

[75] Inventors: Tep Ungchusri, Woodlands; Paul M. Earl, Houston, both of Tex.

[73] Assignee: FMC Corporation, Chicago, Ill.

[21] Appl. No.: 415,465

[22] Filed: Oct. 2, 1989

Related U.S. Application Data

[63] Continuation of Ser. No. 335,630, Apr. 10, 1989, abandoned.

[51] Int. Cl.⁵ ............................. F16J 9/08; F16J 15/32
[52] U.S. Cl. ..................................... 277/151; 277/198;
277/207 R; 277/208; 277/235 R; 285/354
[58] Field of Search ............... 277/138, 151, 157, 165,
277/167.5, 181, 182, 188 A, 190, 198, 207 R,
207 A; 285/94, 95, 336, 370

[56] References Cited

U.S. PATENT DOCUMENTS

| | | | |
|---|---|---|---|
| 1,858,173 | 5/1932 | Smittle | 277/157 |
| 1,860,267 | 5/1932 | Smittle . | |
| 2,789,847 | 4/1957 | Jackson . | |
| 2,792,242 | 5/1957 | Hamlin | 285/370 |
| 2,964,343 | 12/1960 | Klingler . | |
| 2,973,978 | 8/1959 | Oppenheim | 277/188 A |
| 3,118,681 | 1/1964 | Fuehrer . | |
| 3,217,922 | 11/1965 | Glasgow . | |
| 3,390,889 | 7/1968 | Grover . | |
| 3,501,158 | 3/1970 | Tillman, III | 277/171 |
| 3,521,893 | 5/1968 | Josephson | 277/188 A |
| 3,594,022 | 7/1971 | Woodson | 285/336 |
| 3,614,114 | 10/1971 | Traub | 277/165 |
| 3,643,984 | 2/1972 | Bucceri | 285/94 |
| 3,749,426 | 7/1973 | Tillman, III | 285/336 |
| 3,918,725 | 11/1975 | Dryer | 277/167.5 |
| 3,990,712 | 11/1976 | Dechavanne | 277/165 |
| 4,214,763 | 7/1980 | Latham | 277/167.5 |
| 4,441,725 | 4/1984 | Bailey | 277/167.5 |
| 4,470,609 | 9/1984 | Poe | 277/170 |
| 4,471,965 | 9/1984 | Jennings et al. | 277/26 |
| 4,626,002 | 12/1986 | Hagemeister et al. | 285/95 |
| 4,836,583 | 6/1989 | Maier et al. | 285/336 |
| 4,875,405 | 10/1989 | Bernhardt et al. | 277/165 X |

FOREIGN PATENT DOCUMENTS 1316841  5/1973  United Kingdom .......... 277/188 A Primary Examiner—Allan N. Shoap
Assistant Examiner—Scott W. Cummings
Attorney, Agent, or Firm—W. William Ritt, Jr.; Richard B. Megley

[57] ABSTRACT

A plastic bore seal assembly, for use in a static or dynamic mode, comprising a sleeve-type seal element with an annular sealing lip at each end thereof, an anti-extrusion ring surrounding the seal element intermediate the sealing lips, one or more sleeve-like finger springs within the seal element, and optionally a wear sleeve within the seal element bore.

12 Claims, 3 Drawing Sheets

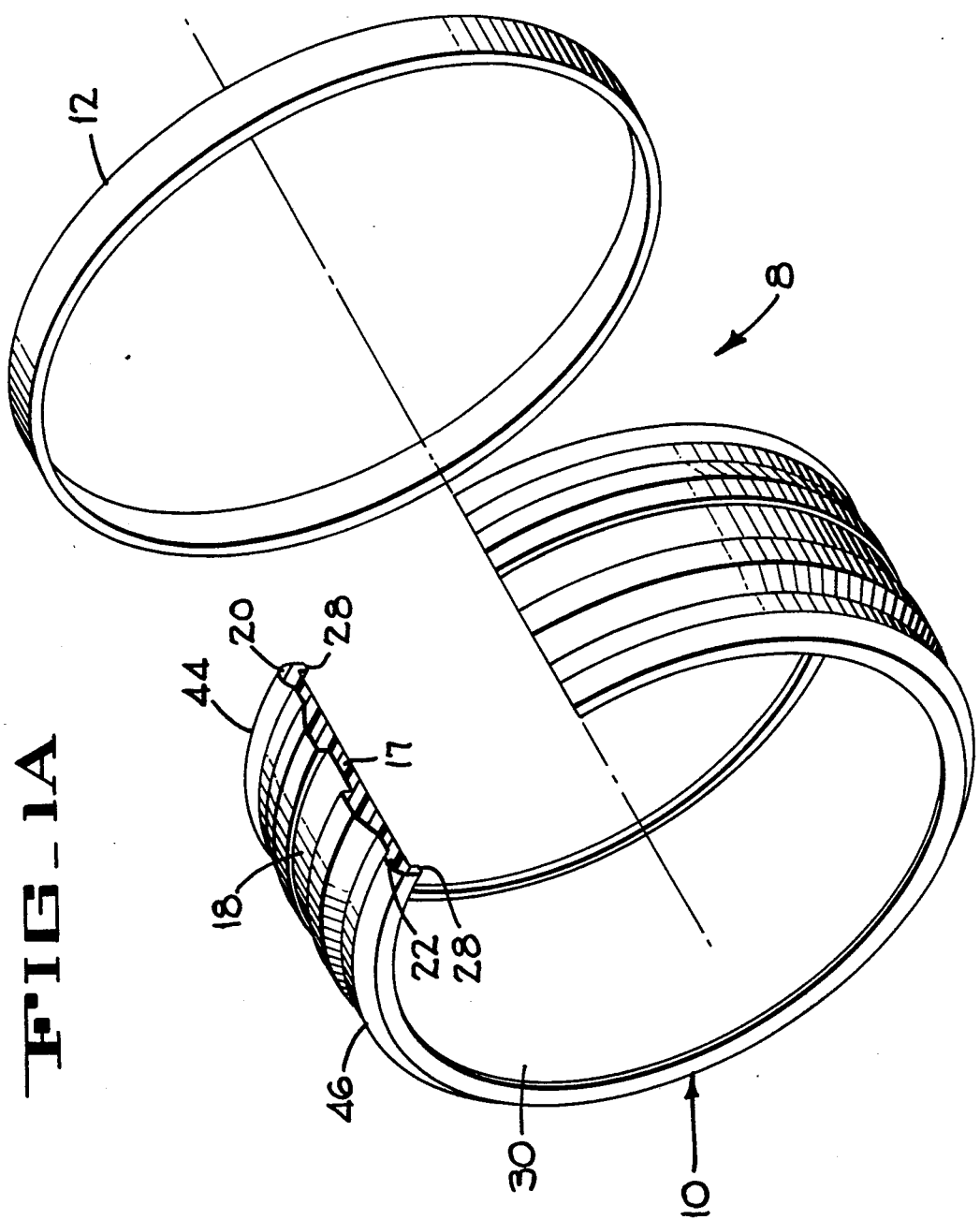

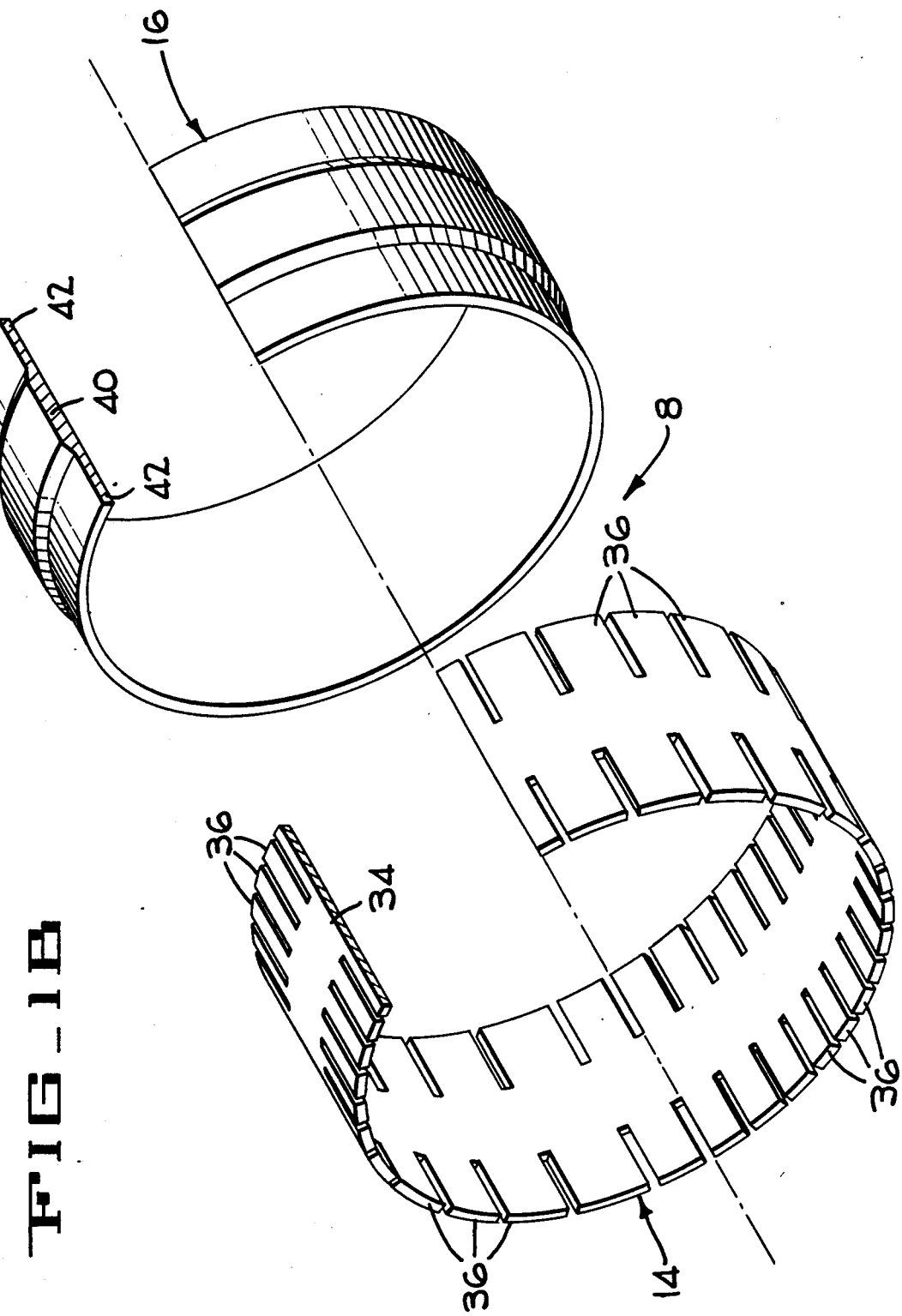

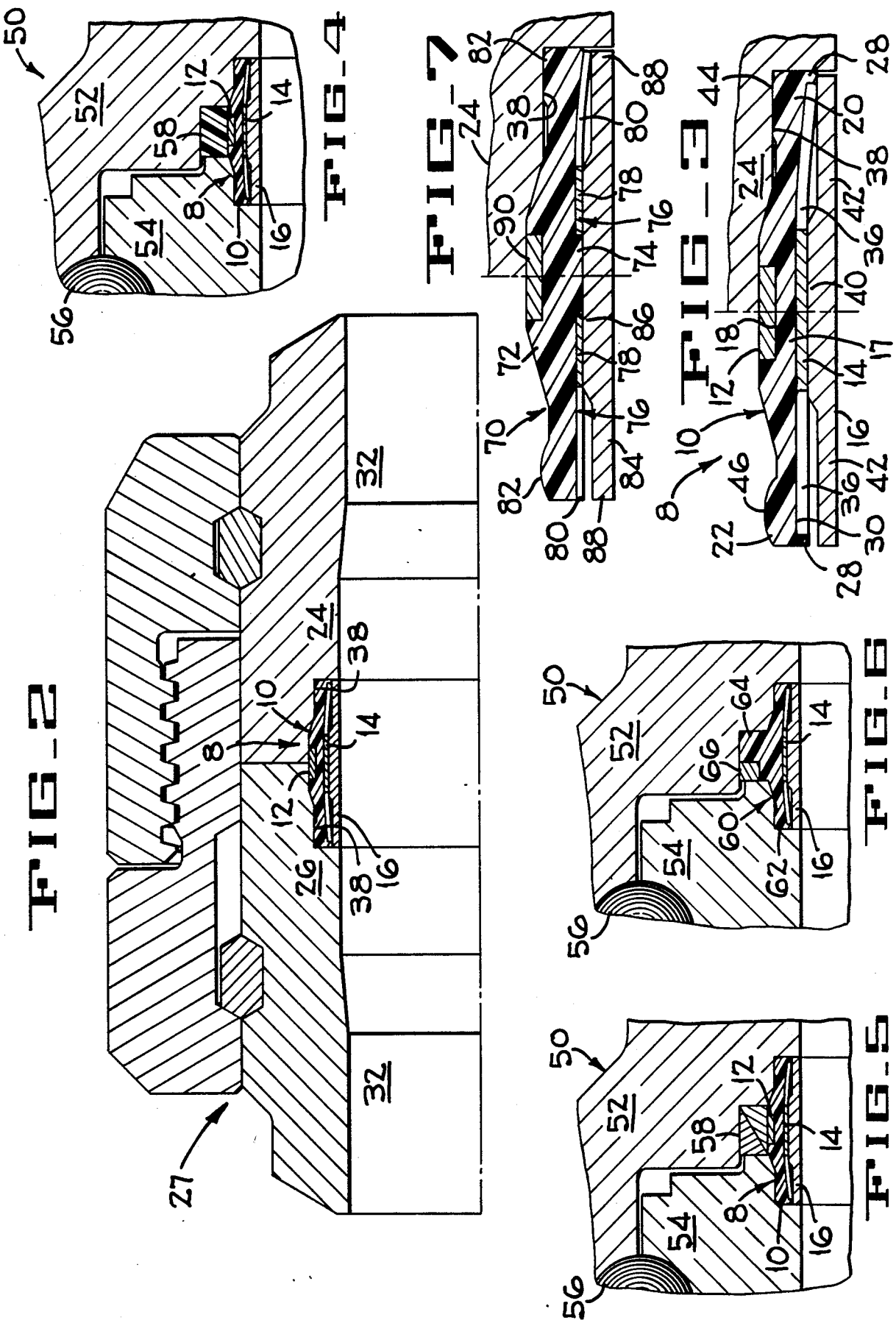

PLASTIC BORE SEAL

This application is a continuation of application Ser. No. 07/335,630, filed 4/10/89.

BACKGROUND OF THE INVENTION

This invention relates to annular bore seals for piping devices, and more particularly to such seals constructed of plastic or other non-metallic compositions that are resistant to elevated temperatures and high pressures.

As indicated by the abundant prior art, annular seals of many designs and compositions have been proposed for use in sealing the bores of various piping devices such as pipe connectors, pipe swivel joints, valves and other oil well drilling and completion equipment, and the results achieved therewith likewise have been varied. Many seals currently used in such devices are made from elastomers which have inherent limitations with respect to extrusion, fluid incompatibility, temperature range, creep, and explosive decompression, i.e. seal rupture resulting from the escape of gas that has permeated the elastomer at high pressure and temperature, when the pressure on the seal is quickly released. A metal seal is used when dealing with broad temperature ranges, extreme pressures and highly adverse fluid environments, but such seals are limited to static or substantially static applications. Furthermore, metal seals will function satisfactorily only with very smooth seal bore surfaces and will leak if the surface is even lightly scratched. Yet another disadvantage with metal bore seals is that the drag between the seal and the bore surface is much higher than that of elastomeric or plastic bore seals, sometimes requiring a seal puller to remove the metal seal from its chamber or pocket. Very careful handling of metal seals is required, such as during packaging and installation, thereby further increasing the difficulty and cost in providing a satisfactory product of this type.

Accordingly, one object of the present invention is to provide a plastic bore seal that will function satisfactorily at high pressures and temperatures in either a static or dynamic mode in a wide variety of piping devices including, for example, conventional pipe connectors and swivel joints. Another object of the present invention is to provide a plastic bore seal that can be used as an alternative to a metal seal counterpart without having to redesign the piping device pocket or chamber in which the seal resides.

SUMMARY OF THE INVENTION

The present invention comprises a plastic bore seal assembly that can be utilized in either a static mode, such as in non-rotatable pipe connectors, or a dynamic mode, such as in pipe swivel joints, to provide a low cost, bubbletight, damage resistant seal that overcomes the above described disadvantages of elastomeric and metal seals. A seal assembly according to the present invention comprises a seal sleeve element of plastic with an annular sealing lip at both ends, an anti-extrusion ring surrounding the seal sleeve intermediate to its sealing lips, one or more annular sleeve-like finger springs surrounded by the seal sleeve, and in some circumstances a wear sleeve within the bore of the seal sleeve and finger spring or springs, the foregoing elements fitting together in a secure manner to constitute an assembly for installation as a unit into the seal chamber or pocket of a pipe connector, swivel joint or other piping device.

The seal sleeve preferably has a centrally located external groove shaped to the configuration of the anti-extrusion ring for retaining said ring in proper position on the sleeve, and when combined with a single finger spring a radially-inward extending flange at both ends to retain the finger spring against axial dislocation from its proper position within the sleeve. The wear sleeve has an axial length commensurate with that of the seal sleeve, and a central outwardly extending annular rib that supports the finger spring or springs in tight-fitting position against the seal sleeve bore.

The seal sleeve can be constructed from various plastic materials as the circumstances of intended use dictate, such as for instance glass/moly filled PTFE (polytetrafluoroethylene) or PEEK (polyetheretherketone). The anti-extrusion ring can be of rectangular cross-sectional configuration with dimensions depending upon the size and shape of the seal chamber or pocket in the pipe connector, swivel joint or other piping device and the location of the interface between the opposed piping elements where extrusion of the seal sleeve is to be prevented. One embodiment of finger spring has an annular continuous central section and a plurality of seal sleeve support fingers extending axially in opposite directions from circumferentially spaced locations on the central section to retain the annular sealing lips of the seal sleeve in proper functional position against the opposed bore surfaces of the pipe connector or swivel joint elements. The central rib of the wear sleeve, which sleeve is not essential to the satisfactory functioning of the seal assembly of this invention but is preferably included where erosion of the finger spring and seal sleeve by fluid flow through the connector or swivel joint is a problem, is sized and located to bear tightly against the central section of the finger spring and hold the complete seal assembly together, while the lesser outside diameter of the wear sleeve opposite ends provide room for the spring fingers to flex radially inwardly as the seal assembly is installed in tight-fitting position in its chamber or pocket in the connector, swivel joint or other piping device.

BRIEF DESCRIPTION OF THE DRAWINGS

FIG. 1, comprising FIGS. 1A and 1B, is an exploded isometric view of a plastic bore seal assembly according to the present invention, showing the cross-sectional configuration of the seal sleeve, the finger spring and the wear sleeve.

FIG. 2 is a longitudinal section view, on a reduced scale, of a pipe connector with the seal assembly of FIG. 1 installed therein.

FIG. 3 is an enlarged longitudinal section view of the assembled seal assembly of FIG. 1, the left half of the view showing the assembly prior to installation in its chamber, and the right half of the view showing the assembly installed in the chamber.

FIGS. 4 and 5 are fragmentary longitudinal section views of the seal assembly of FIGS. 1-3 installed in pipe swivel joints fitted with anti-galling/anti-extrusion rings.

FIG. 6 is a fragmentary longitudinal section view of another embodiment of a plastic bore seal assembly in accordance with the present invention.

FIG. 7 is a view like FIG. 3 but illustrating yet another embodiment of a seal assembly according to the present invention.

DESCRIPTION OF THE PREFERRED EMBODIMENT

The plastic bore seal assembly 8 illustrated in FIGS. 1-5 comprises a sleeve-like plastic seal element 10, an anti-extrusion ring 12, a sleeve-like finger spring 14, and a wear sleeve 16, these elements shown properly assembled together in FIGS. 2-5.

The seal element 10 comprises a central portion 17 with an outer annular groove 18 within which resides (FIGS. 2-5) the anti-extrusion ring 12, two sealing lips 20, 22 each extending axially from the central portion 17 for establishing a fluid-tight seal with opposed ends 24, 26 of a pipe connector 27 such as shown in FIG. 2, and an inwardly-extending radial flange 28 at each end for retaining the finger spring 14 in proper position in the seal element bore 30. The anti-extrusion ring 12 is of rectangular cross-section and is located to bridge the gap between the opposed pipe connector ends 24, 26, thereby preventing extrusion of the plastic seal element 10 into that gap in response to high pressure in connector bore 32.

The finger spring 14 has a central annular continuous portion 34, and a plurality of circumferentially spaced spring fingers 36 extending axially in opposite directions from the central portion 34. The spring fingers 36 support the seal sleeve lips 20, 22 in fluid-tight contact with the adjacent bore surfaces 38 of the connector elements 24, 26 and serve to provide the seal sleeve with a memory property that is not affected by high pressure and temperature cycling.

The wear sleeve 16 has a central portion 40 that fits against the finger spring central portion 34, and end portions 42 of lesser outside diameter that reside radially inward from the spring fingers 36. As seen best in the right half of FIG. 3, the annular space between the wear sleeve end portions 42 and the spring fingers 36 enable the fingers to flex radially inward during installation of seal assembly into its chamber or pocket in the pipe connector 27.

The seal sleeve lips 20, 22 preferably have radiused surfaces 44, 46 that press tightly against the adjacent bore surfaces 38 of the pipe connector ends 24, 26. This provides a relatively large lip sealing area that produces a reliable yet forgiving pressure-tight interface between the seal and the connector bore, and also a minimum of only one potential leak path past each lip.

In FIGS. 4 and 5 the seal assembly 8 is shown in functional position in a pipe swivel joint 50 having relatively rotatable elements 52, 54 connected by a plurality of bearing balls 56 (only one shown) in the usual manner. In order to reduce or eliminate galling and provide additional anti-extrusion properties, the swivel joint 50 includes an anti-extrusion ring 58 against which the seal assembly anti-extrusion ring 12 resides. The anti-extrusion ring 58 can be one solid element as shown in FIG. 4, or as seen in FIG. 5 it can comprise two elements, each of triangular cross-section, that will diverge axially when pressure is applied from the seal assembly 8 to eliminate any radial extrusion gap between the joint elements 52, 54.

FIG. 6 illustrates a modified version 60 of the seal assembly 8 installed in functional position in the swivel joint 50. The plastic seal sleeve 62 of the seal assembly 60 has a central rib 64 extending radially outwardly into the space otherwise occupied by the anti-extrusion ring 58 of the embodiments shown in FIGS. 4 and 5, and a square or rectangular cross-section anti-extrusion ring 66 bridging the gap between the joint elements 52, 54. The anti-extrusion rings can be constructed of plastic or a metallic material to provide protection under high pressure should the primary plastic seal sleeve 10 be damaged by high temperature.

FIG. 7 illustrates yet another embodiment 70 of plastic bore seal assembly according to the present invention. The seal assembly 70 includes a plastic seal sleeve 72 that closely resembles its counterpart 10 of FIGS. 1-5, but which has a radially inwardly oriented central annular rib 74 and does not have inwardly-extending radial flanges at its ends as does sleeve 10 at 28; otherwise the sleeves 72 and 10 are essentially identical in configuration. The seal assembly 70 further includes two identical sleeve-like finger springs 76, as contrasted with the single finger spring 14 of seal assembly 8, each finger spring 76 having an annular continuous portion 78 and a plurality of circumferentially spaced spring fingers 80 extending axially from one end of the portion 78. The finger springs 76 are positioned against opposite ends of the seal sleeve's central inner rib 74 as seen in FIG. 7, and the spring fingers 80 underlie and support the sealing lips 82 of the seal sleeve 72 like the fingers 36 underlie and support the lips 20, 22 of the sleeve 10. In this FIG. 7 embodiment a wear sleeve 84, with an axially elongated central portion 86 around which reside the continuous portions 78 of the springs 76, and reduced outside diameter end portions 88 over which the spring fingers 80 extend, provides protection against erosion as does its counterpart 16 of the assembly 8. As shown in FIG. 7, the seal assembly 70 also includes an anti-extrusion ring 90 of the same configuration and providing the same function as its counterpart 12 of the assembly 8.

Although the best mode contemplated for carrying out the present invention has been shown and described herein, it will be apparent that modification and variation may be made without departing from what is regarded to be the subject matter of the invention.

What is claimed is:

1. A plastic bore seal assembly for use as a static/dynamic seal in pipe connectors, pipe swivel joints and other piping devices, said assembly comprising;
   (a) a plastic seal sleeve having a bore, a central portion with an external annular groove, and two opposite end portions each including an annular sealing lip;
   (b) an anti-extrusion ring surrounding the seal sleeve in the external groove; and
   (c) at least one sleeve-like finger spring residing in the seal sleeve bore, said spring having a continuous annular portion and a plurality of spring fingers extending axially from said annular portion, said spring fingers supporting a seal sleeve lip in its functional position and providing said lip with a memory property that is not affected by high pressure and temperature cycling.

2. A seal assembly according to claim 1 wherein the seal sleeve also includes an annular radial flange extending inwardly from each of the sleeve ends to retain the finger spring in proper axial location within said sleeve.

3. A seal assembly according to claim 1 wherein each seal sleeve sealing lip has a radiused surface for cooperation with the bore surface of a piping device to provide a fluid-tight seal therebetween.

4. A seal assembly to claim 1 wherein the anti-extrusion ring is rectangular in cross-section and is located midway between the ends of the seal sleeve.

5. A seal assembly according to claim 1 wherein the anti-extrusion ring is square in cross-section and is located at an annular edge of the seal sleeve central portion.

6. A seal assembly according to claim 1 wherein the seal sleeve central portion extends radially outward to an outside diameter that is substantially greater than the outside diameter of the sleeve's annular sealing lips.

7. A seal assembly according to claim 1 wherein the spring fingers are circumferentially spaced about the finger spring's central portion.

8. A seal assembly according to claim 7 wherein the spring fingers are separated from each other by narrow axial slots in the finger spring.

9. A seal assembly according to claim 1 further comprising a wear sleeve within a bore of the finger spring to prevent erosion of said spring by material flowing through said bore.

10. A seal assembly according to claim 9 wherein the wear sleeve has a central outwardly extending annular rib that supports the finger spring in tight-fitting position against the seal sleeve bore.

11. A seal assembly according to claim 1 wherein the finger spring annular portion is located midway between opposite ends of the spring, and spring fingers extend axially in opposite directions from said annular portion.

12. A seal assembly according to claim 1 including two finger springs with the continuous annular portion of each located adjacent to the central portion of the seal sleeve.

* * * * *